United States Patent [19]
Powell

[11] 3,968,987
[45] July 13, 1976

[54] BELL HOUSING ASSEMBLY UNIT

[76] Inventor: Harvey E. Powell, P.O. Box 142, Blue Mountain, Miss. 38610

[22] Filed: Jan. 6, 1975

[21] Appl. No.: 538,590

[52] U.S. Cl. .......................... 294/78 R; 294/82 R
[51] Int. Cl.² .......................................... B66C 1/14
[58] Field of Search ............. 294/78 R, 82 R, 83 R; 24/135 R, 135 A, 135 L, 135 M, 135 N, 230.5 R, 230.5 AD, 230.5 TH, 230.5 SS, 232

[56] References Cited
UNITED STATES PATENTS

| 249,177 | 11/1881 | Healey | 294/82 R X |
|---|---|---|---|
| 1,645,714 | 10/1927 | Neilson | 294/82 R |
| 1,806,469 | 5/1931 | Koons | 294/82 R |
| 1,898,524 | 2/1933 | Cotesworth et al. | 294/78 R |
| 3,055,697 | 9/1962 | Lundskog | 294/83 R |
| 3,337,256 | 8/1967 | Shropshire | 294/82 R |

*Primary Examiner*—Evon C. Blunk
*Assistant Examiner*—Johnny D. Cherry

[57] ABSTRACT

A new design of an hook device attachable on an end of a cable or rope, and which comprises a bell housing assembly, having among it's advantages a greater holding strength, and being easier and quicker to attach. The bell housing assembly consists of a ring assembly in which parts swing respective to each other and the ring assembly supports a pair of pivotable claw hook members which face each other. The device also includes a securement band unit which rigidly locks on the end of a supporting cable or rope.

4 Claims, 4 Drawing Figures

U.S. Patent   July 13, 1976   3,968,987
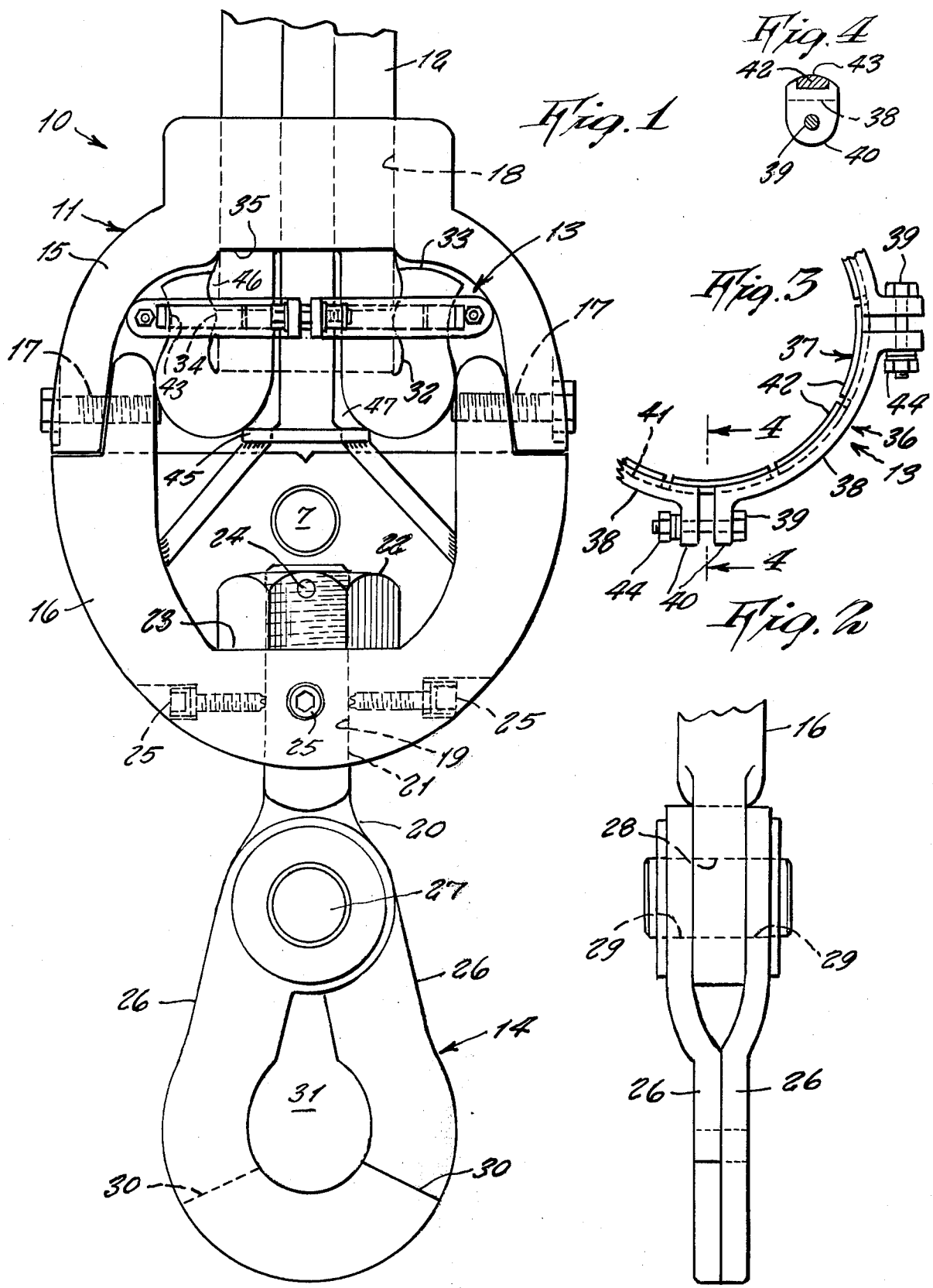

BELL HOUSING ASSEMBLY UNIT

BACKGROUND OF THE INVENTION

This invention relates generally to hooks mountable on the ends of cables and or ropes. It may be employed for use on suspension bridges, where its application would be stable, rather than versatile, although generally its application is versatile.

SUMMARY OF THE INVENTION

A principal object of the present invention is to provide a bell housing assembly unit of improved design for securement to the end of a rope or cable, and which incorporates claw hooks for supporting a load, and wherein the design gives greater strength than conventional hooks.

Another object is to provide a bell housing assembly unit which while being primarily for applications pertaining to the sea, such as lowering or lifting objects from the sea or securing floating objects, is also readily applicable for use on terrestial equipment such as on booms and draglines of all types, and can be adapted for use on suspension bridges.

Yet another object is to provide a bell housing assembly unit wherein a major asset of its design is its aesthetic beauty in appearance and wherein the contour of its lines gives a pleasing effect to the beholder which inspires and at the same time is a quality product.

Yet a further object is to provide a bell housing assembly unit which can be readily secured to either a rope or cable, and which can be manufactured in different sizes to accommodate any line.

Yet a further object is to provide a bell housing assembly unit which is superior to open face hooks in that jerking booms cannot dislodge the payload within the claw hook, and a slack line will never dislodge the claw hook.

Yet another object is to provide a bell housing assembly unit which saves on considerable length of line, such as when tying a ship to a dock. Due to a unique attachment by means of the line to the docking device, the unit eliminates the need of line twisting, turning, wrapping and tying.

Still a further object is to provide a bell housing assembly unit which will eliminate the usual back-breaking exertion associated with securement of a two inch diameter or thicker rope to a hook. The present invention incorporates a design which allows rapid attachment or dis-attachment of a rope or cable, and with minimum physical effort by the operator.

By incorporating the bell housing assembly unit for use on suspension bridges it could be employed in such a way that the cables used in suspension could be replaced with minimum effort after a period of years, and the bridge could be continually up-dated with new cables after a prescribed number of years in use, thereby reducing worrying and mental fatigue on the part of the operator. The vertical line would employ the bell housing assembly on each end and replacement would simply be the removal of the old line and the putting in of new cables attached at both ends with bell housing assemblies. Also, the main cables could employ the use of the bell housing assembly and could be designed with removal and replacement in mind from the beginning.

By using bell housing assemblies on the ends of all cables the bridge could be perpetually up-dated with a minimum of effort. With new cables being used periodically, the life and usefulness of the bridge could be prolonged many years. With this system, smaller lines could be used initially and the cost of the original construction would be lessened.

The claw would be eliminated from the bell housing assembly unit for application on suspension bridges. Thus the eye bolt would constitute the end of the bell housing assembly for this application. To secure the cable attached with the bell housing assemblies, one would simply have to drive a pin through the eye bolt and the cable would be secured to the bridge attachment.

Other objects are to provide a bell housing assembly unit which is simple in design, inexpensive to manufacture, rugged in construction, easy to use and efficient and safe to operate.

BRIEF DESCRIPTION OF THE DRAWINGS

These and other objects will be readily understandable upon a further study of the following specification, and the accompanying drawings wherein:

FIG. 1 is a side elevated view of the present invention.

FIG. 2 is a fragmentary end view thereof, illustrating the claw hook.

FIG. 3 is a fragmentary view of the rope or cable securement band unit.

FIG. 4 is a cross sectional view taken on line 4—4 of FIG. 3.

DETAILED DESCRIPTION OF THE PREFERRED EMBODIMENT

Referring now to the drawings in detail, the reference numeral 10 represents a bell housing assembly unit according to the present invention, wherein there is a swing ring assembly 11 fitted on an end of a rope or cable 12, and which is firmly fastened thereto by a securement band unit 13. The swing ring assembly supports a claw hook unit 14 for grasping an object.

The swing ring assembly 11 consists of an upper inverted U-shaped member 15 and a lower U-shaped member 16, each of which are preferably forged to have great strength, and which are pivotally attached together by means of heavy bolts 17 fitted through opposite ends of the members, the bolts being axially aligned with each other, in order that the lower member is free to swing respective to the upper member. A vertical opening 18 through a center of the upper member serves to receive the cable or rope. The lower member has a vertical opening 19 from which the claw hook unit 14 is supported.

The claw hook unit includes an eye bolt 20, having a shank 21 which slide fits in opening 19. The terminal end of the shank is threaded, thereby engaging a hexagonal nut 22, which rests upon an upper surface 23 of the lower member. A transverse opening 24 through the nut and threaded portion of the shank serves to receive a cotter pin for preventing the nut from accidentally becoming loosened. A plurality of socket head set screws 25 secures rigidly the shank within the opening 19.

Additionally the claw hook includes a pair of claw hook members 26, supported pivotally free on a transverse, heavy pin 27 which extends through eye opening 28 of the eye bolt, and an eye opening 29 of each of the hook members as shown in FIG. 2. Each hook member is of inverted, question mark shape. The hook members face each other, in order that their hook ends, 30, together form a central opening 31 therebetween and in which loads or other objects are supported. The opening 31 becomes open when the hook members are pivoted away from each other.

The securement band unit 13 comprises a collar-like device which fits around the terminal end of the rope or cable after being downwardly inserted through opening 18, and through a close fit sleeve 32. As shown in FIG. 1, the individual strands 33 of the rope or cable are then upwardly turned, therefore, positioned against an outer side of the sleeve which includes an annular groove 34, and into which the strands are squeezed by the band unit 13 fitted therearound. The sleeve 32 protrudes into the bottom surface 35 of the ring upper member 15. It is wedged thereinto to make it immovable. The strands 33 rest upon a ring 45, which protrudes into the upper housing 15, but this ring 45 is supported in the lower housing 16. The lower housing 16 is inserted into the upper housing 15 by hydraulic pressure. This pressure exerts force upon the wedge ring 46, and thus the cable end 12 is jammed into an immovable position within the upper half of the assembly 15. It is supported internally by bellows 47, and on the outside by the upper insertion of the lower bell housing unit 16 into the upper unit 15 and on the bottom by support ring 45. When the units are combined in the whole by shear bolt 17, the whole upper unit of cable 12 and rings 13, 32 and 46 becomes immovably affixed into the upper half of the bell housing 15.

The band unit 13 consists of a circular contraction band 36 and a wedge band 37. The contraction band is comprised of four arcuate quadrants 38 attached together by bolts 39 passed through adjacent radially outwardly extending lugs 40 formed on each end of the quadrants. A groove 41 on an inner periphery of the quadrants serves to seat a plurality of wedge segments 42, which comprises the wedge band 37. As shown in FIG. 4, it is to be noted that the radially inward periphery of the wedge band is inwardly convex in order to form a rounded surface 43 which corresponds to the configuration of annular groove 34, so that the strands 33 compressed therebetween are rigidly held thereby, as is evident in FIG. 1. In firmly securing the collar-like band unit 13 around the strands 33, nuts 44 mounted on bolts 39 are turned, thus drawing the quadrants together so that the band 36 contracts in size and compresses the strands with a strong frictional grasp.

In the installation of a cable on the bell housing assembly, it is to be noted that the lines within the center of the housing will be ensheathed in plastic in order to be completely water proof, and the lines in the center of the cable will be made sufficiently long in order to engage the lower member 16 and be attached thereto as suggested on the drawing FIG. 1.

The orifice 7 is to be filled with an electrical component, which will provide waterproof posts which will allow electrical power to exit from the lower housing 16 into such components which may be attached to the claw hooks 26 being entrapped in area 31. No attempt is made to waterproof the rope or cable inserted into the upper bell housing 15 through orifice 18. Rather the air hose and electrical components which exit through orifice 7 are the components which will be waterproofed. This feature is provided for future applications that shall arise from uses that will be employed by the bell housing assembly unit.

Alterations can be made such as the removal of the claw hooks for application to suspension bridges. It would be preferable for this application to affix pin 27 to the bridge fitting, rather than to a claw hook, because the use of the claw hook in this application would be superfluous. The eyebolt being secured to the fitting of the bridge would be a more appealing attachment than going through the claw hooks. This would definitely facilitate the ease of replacing cables rather than transferring support through the claw hooks. The claw hook is an asset only where manual attachment is involved. For stable applications such as suspension bridges, it would be a detriment requiring a stretching of the cable over point 30 of the claw hook, whereas by attaching directly to the eyebolt this additional height would not need to be attained to secure an attachment. The claw hook will generally be preferred in making the bell housing assembly, for it will allow more versatility of application, however, for the suspension bridge it would be a liability.

In case of an accident, similar to an aircraft ramming into a suspension bridge and breaking or damaging the vertical cables, by using the bell housing assemblies, replacements could be effected readily to repair the damaged section. Application of this unit could also be made on existing bridges to supplement strength wherein existing cables suffer from fatigue.

Thus there is provided an improved design of a bell housing assembly. However, while various changes may be made in the detail construction, it is understood that such changes will be within the spirit and scope of the present invention, or as defined by the appended claims.

I claim:

1. In a bell housing assembly, the combination of a swing ring assembly to be fitted on a cable or rope, a securement band unit for securement to said cable or rope and a claw hook unit supported on said swing ring assembly;

said swing ring assembly comprising an upper U-shaped member and a lower U-shaped member pivotally attached together by axially aligned bolts through opposite ends of said U-shaped members, a vertical opening on said upper member for receiving said cable or rope and a vertical opening in said lower member for receiving said claw hook unit;

said claw hook unit comprising an eye bolt having a shank received through said vertical opening of said lower member and fitted with a nut and a pair of claw hook members pivotally depending on a transverse pin received through an eye of said eye bolt; and said securement band comprising a sleeve, a circular contraction band and a wedge band.

2. The combination as set forth in claim 1, wherein said sleeve comprises a tubular member, positioned against an under surface of said upper U-shaped member, and having an annular groove around an outer side thereof.

3. The combination as set forth in claim 2, wherein said circular contraction band is comprised of a plurality of quadrants, having radially outward lugs at each end enjoined by nuts and bolts, and a groove on an inner periphery of said contraction band seating said wedge band.

4. The combination as set forth in claim 3, wherein said wedge band is comprised of a plurality of wedge segments, a radially inward edge of which are convex to correspond to said annular groove of said sleeve.

* * * * *